United States Patent [19]

Naedler et al.

[11] Patent Number: 5,607,033
[45] Date of Patent: Mar. 4, 1997

[54] DISC BRAKE CALIPER HAVING A LINEAR SLACK ADJUSTER ASSEMBLY

[75] Inventors: Mark H. Naedler, San Antonio; Victor E. Teinert, Friendswood, both of Tex.

[73] Assignee: Mark +2 Technologies, Inc., Montgomery, Tex.

[21] Appl. No.: 552,005

[22] Filed: Nov. 2, 1995

[51] Int. Cl.⁶ ............................................ F16D 55/02
[52] U.S. Cl. .................. 188/71.8; 188/196 P; 188/196 B
[58] Field of Search ............................. 188/71.8, 71.9, 188/71.7, 72.7, 72.9, 196 R, 196 B, 196 P, 196 V

[56] References Cited

U.S. PATENT DOCUMENTS

| | | | |
|---|---|---|---|
| 2,900,052 | 8/1959 | Frayer et al. | 188/71.8 |
| 3,255,851 | 6/1966 | Griesen-brock . | |
| 3,365,029 | 1/1968 | Swift | 188/196 B X |
| 3,402,791 | 9/1968 | Hoenick | 188/71.8 X |
| 3,575,268 | 4/1971 | Kimata | 188/71.8 |
| 3,651,896 | 3/1972 | Fannin | 188/71.8 |
| 3,837,437 | 9/1974 | Martins | 188/71.8 |
| 3,954,159 | 5/1979 | Margetts | 188/196 D |
| 3,995,722 | 12/1976 | Jones et al. | 188/71.9 |
| 4,159,754 | 7/1979 | Airheart et al. | 188/71.8 |
| 4,169,525 | 10/1979 | Tregoning | 188/196 D |
| 4,399,894 | 8/1983 | Tribe | 188/71.9 |
| 4,449,616 | 5/1984 | Musser, Jr. et al. | 188/71.8 |
| 4,635,762 | 1/1987 | Nilsson et al. | 188/203 |
| 4,724,741 | 2/1988 | Wirth | 188/71.8 |
| 4,795,005 | 1/1989 | Wirth | 188/153 R |
| 4,867,283 | 9/1989 | Dill | 188/196 P |
| 5,076,401 | 12/1991 | Ta et al. | 188/71.9 |
| 5,350,043 | 9/1994 | Crewson et al. | 188/79.55 |

OTHER PUBLICATIONS

Knorr–Bremse Brochure entitled "Pneumatic Disc Brakes for Trucks, Trailers and Busses".
"Braking Medium Weight Vehicles", pp. 140–146.
"Vehicle Braking" by A. K. Baker, cover and pp. 124–125.

*Primary Examiner*—Peter M. Poon
*Attorney, Agent, or Firm*—Vaden, Eickenroht & Thompson

[57] ABSTRACT

There are disclosed several embodiments of a disc brake caliper assembly in which adjustment is made for wear on the pads by a non-rotating linearly expandable and retractable linkage arranged between a brake actuator and the pads. The linkage includes inner and outer members coaxially reciprocal without rotation with respect to one another, one member having surfaces which extend at acute angle with respect to the axis and opposite surfaces on the other member which extend parallel to the axis. Circumferentially spaced wedges are disposed in the space between the angled and parallel surfaces, and springs between the first member and wedges yieldably urge the wedges in the first longitudinal direction toward the angled surfaces, the second member being movable during the braking cycle in a second longitudinal direction and thus relatively to the first member, whereby the linkage is caused to expand in order to adjust for wear.

20 Claims, 4 Drawing Sheets

5,607,033

DISC BRAKE CALIPER HAVING A LINEAR SLACK ADJUSTER ASSEMBLY

This invention relates generally to a disc brake caliper assembly having means by which adjustment is made for wear on the brake pads. In one of its aspects, it relates to an assembly of this type in which adjustment is made through an improved linearly expandable and contractible linkage.

In a typical disc brake system, the disc is arranged to be compressed between pads of friction material within a caliper housing in response to brake actuation. As the pads wear, travel required to maintain contact between the pads and disc must be maintained closely in order to avoid over-extending actuator travel. This presents no problem in the case of hydraulic brakes since the reservoir of hydraulic fluid takes up for the void.

However, hydraulic brakes are not sufficient for use as parking brakes since the application pressure can be lost over time and will result in no braking force. Hence, there is a need, in the case of parking and other types of brake assemblies, to incorporate an expandable and retractable linkage between the pads and brake actuator which has the ability to compensate for friction material wear and then, following pad replacement, return to a reset position.

The most common mechanical linkage for this purpose are helical threads. In the case of drum brakes, a ratcheting gear mechanism is sometimes used to turn one member of the threaded expansion mechanism. These designs often rely on a backlash motion from the drum for adjustment.

Expensive threads and slip clutches are also often used in disc brakes to keep the clearance small. However, certain members must rotate relative to other members to create expansion, and the need to insure proper friction coefficients and provide adequate threads, as well as means of rotating and not rotating specific members, is often costly and complicated.

According to another approach, a pawl moves through relatively large, spring loaded ratchet element to compensate for slack (see Fannin U.S. Pat. No. 3,651,896). Since the ratcheting teeth oppose only shear, they must be relatively large, creating large variations in clearance. Full pawl engagement cannot be assured, and the means to reset the mechanism when the friction material needs replacement is expensive or nonexistent.

The object of this invention is to provide an assembly of this type having a linkage which is of such construction as to overcome these and other problems, and, more particularly, which does not require rotation of one or more of its linearly expandable and contractible members of the linkage. Thus, it instead includes a wedge means in the form of slips disposed in wedging position within a space between the inner and outer, relatively reciprocable tubular members of the linkage which extend between a brake actuator and the inner pad such that they provide a wedging force, during a brake actuation, but automatically release that force when expansion is required or to permit the linkage to reset.

In the preferred and illustrated embodiments of the invention, the disc brake caliper assembly includes inner and outer members mounted for coaxial longitudinal reciprocation without rotation with respect to one another, a first of the inner and outer members having surfaces which extend at an acute angle with respect to the axis and opposite surfaces of the second member which extend parallel to such axis to provide a space between them to receive the circumferentially spaced wedge means and means acts between the first member and wedge means to yieldably urge the wedge means in a first longitudinal direction toward the angled surfaces and thus into a wedging relation between the members to restrict motion of the second member in the first direction relatively to the first member. More particularly, means are operable during a brake cycle for moving the second member longitudinally in a second longitudinal direction opposite to the first longitudinal direction and thus relatively to the first member whereby the linkage is caused to expand in order to adjust for pad wear.

As disclosed, the second member is so moved by an arm which is connected to a fluid actuator, and the second member is urged to return to its original position by spring means, in one embodiment of the invention, or by connection of the arm to the second member, in other embodiments. In accordance with these other embodiments of the invention, a piston is formed on the outer member and a means is provided for admitting fluid pressure to the interior of the housing in order to act over the piston to urge it toward the inner pad, thus providing a secondary and independent arrangement for brake actuation.

As illustrated, the surfaces on the members are conical and cylindrical, and the wedge means are circumferentially spaced slips having similarly formed surfaces. The cylindrical surfaces may have teeth to engage teeth on the slips. The conical surfaces may be on the inner member or on the outer member.

In accordance with another novel aspect of the invention, a longitudinally slidable means has one end accessible from outside the assembly and the other end engageable with the slips to permit the slips to be moved out of wedging position so that the members may be reset.

In the drawings, wherein like reference characters are used throughout to designate like parts:

Figure 1:
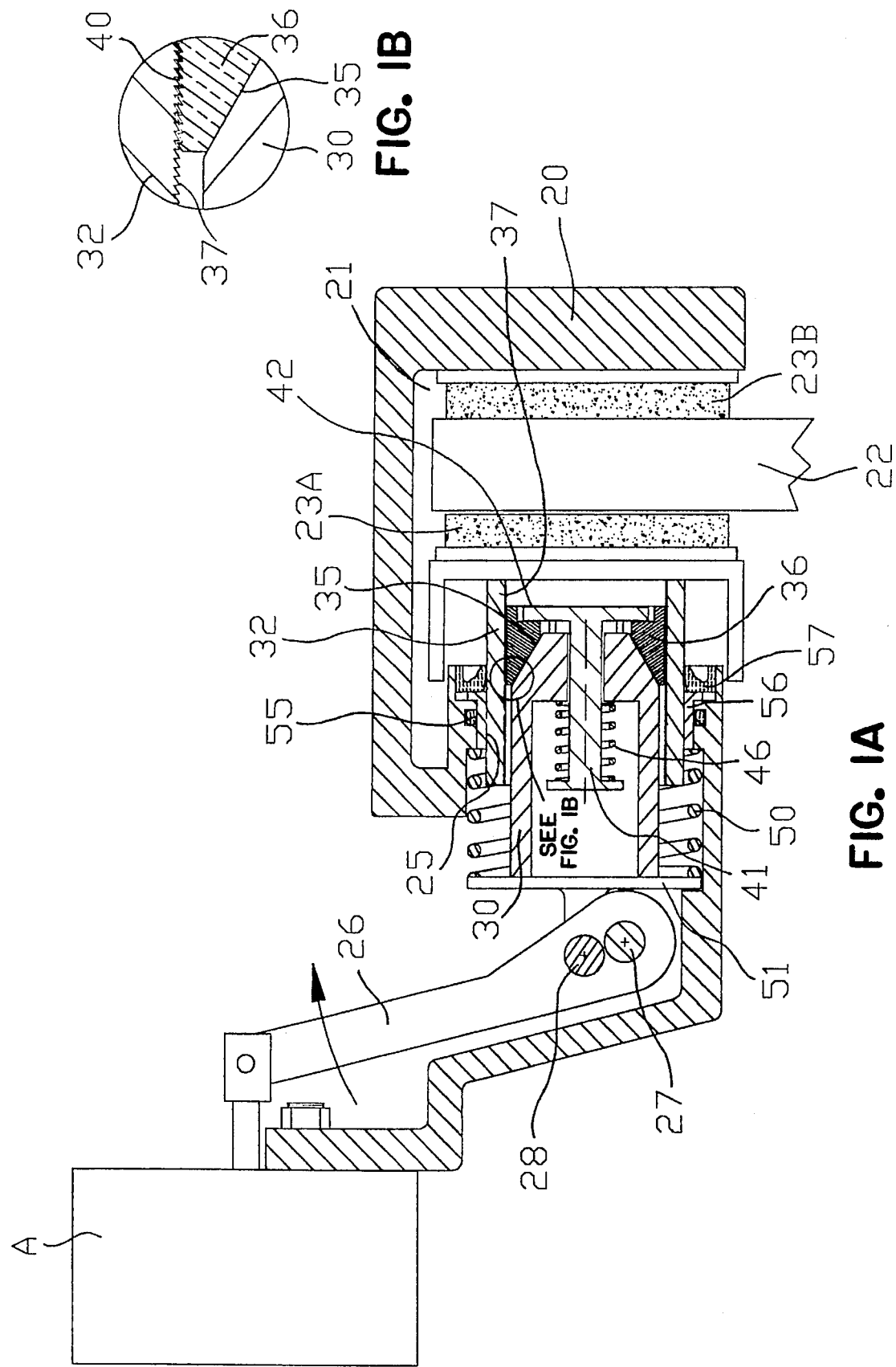
FIG. 1A is a longitudinal sectional view of a disc brake assembly constructed in accordance with one embodiment of the present invention
FIG. 1B is an enlarged detailed sectional view of the encircled portion of FIG. 1A.
Figure 2:
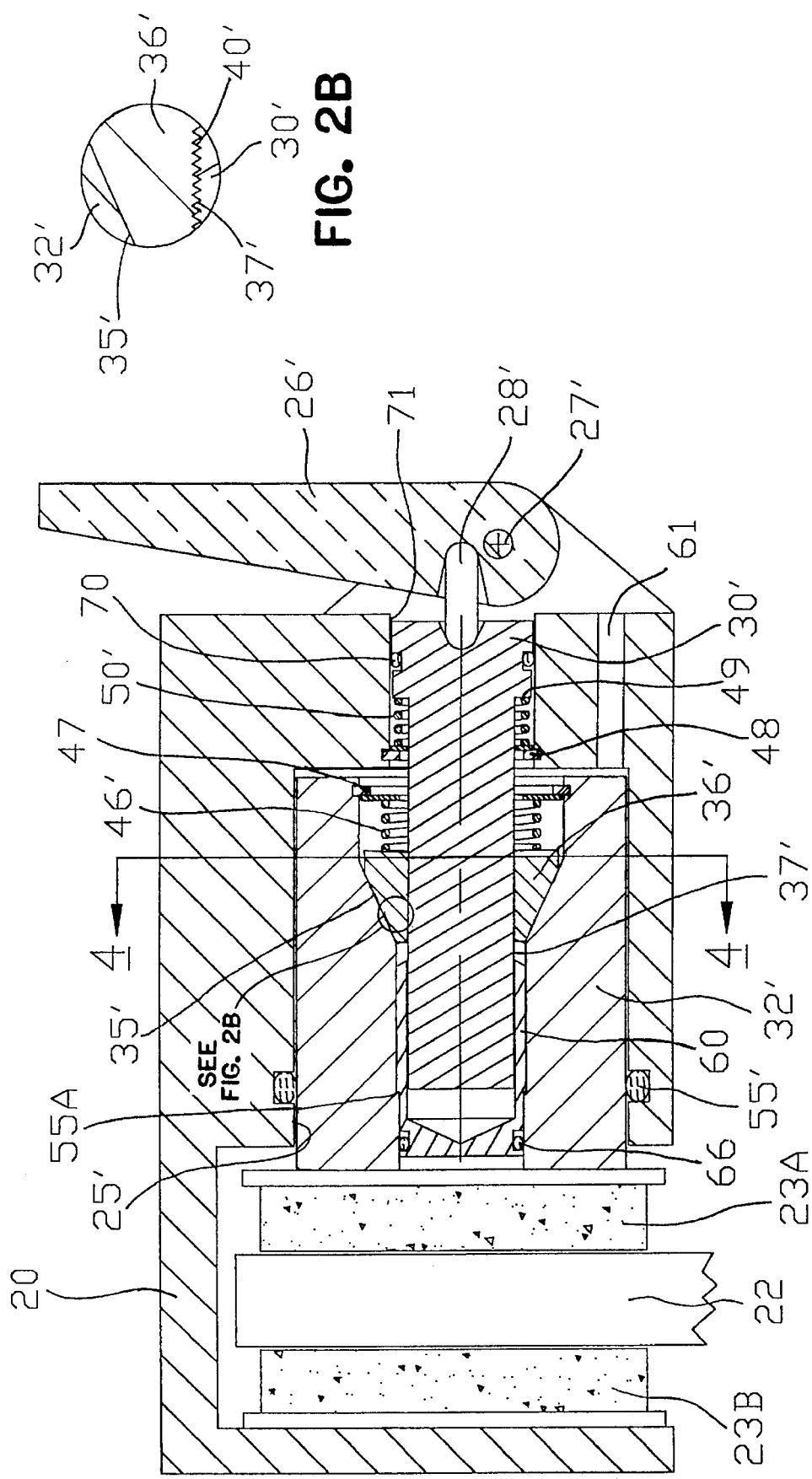
FIG. 2A is a longitudinal sectional view of a brake assembly constructed in accordance with another embodiment of the present invention
FIG. 2B is an enlarged detailed sectional view of the encircled portion of FIG. 2A.
Figure 3:
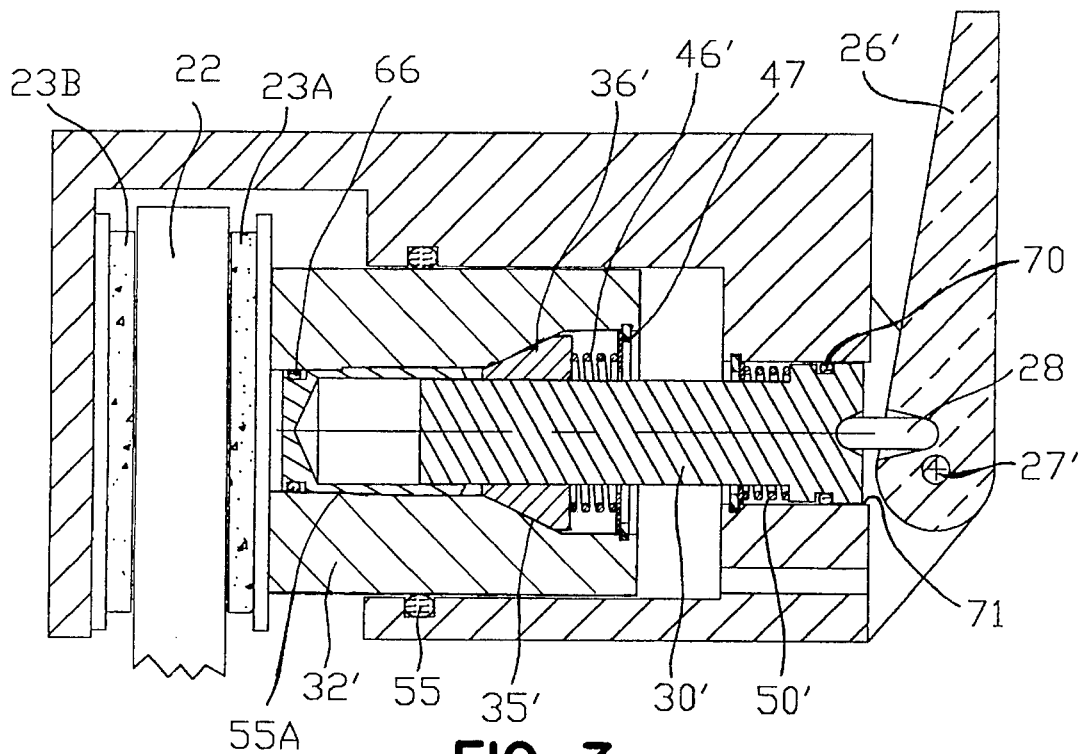
FIG. 3 is another view of the embodiment of the brake assembly similar to FIG. 2, but following wear on the brake pads.
Figure 4:
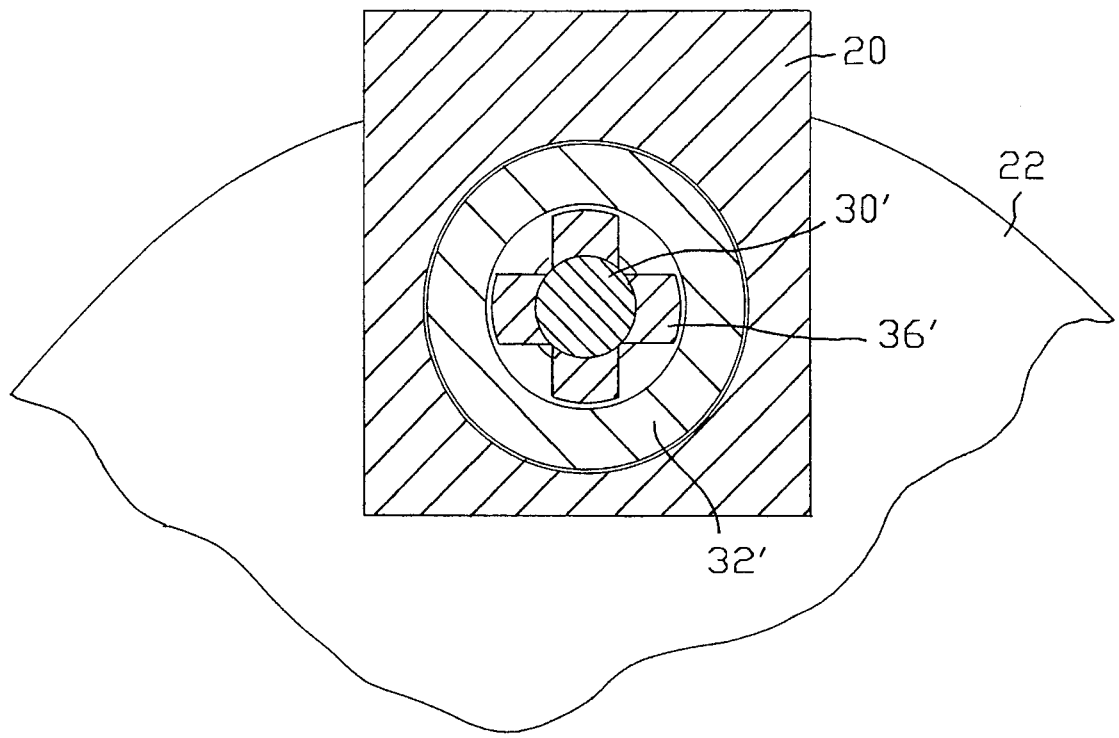
FIG. 4 is a partial cross-sectional view of the embodiment of the brake assembly of FIG. 2A, as seen along broken lines 4—4.

With reference now to the details of the drawings, the brake assembly of the embodiment of FIG. 1A is shown to include a caliper housing 20 having an interior 21 to receive a disc 22 and pads 23A and 23B on opposite sides thereof with outer pad 23B adjacent the inner side of the right-hand wall of the housing. The housing further has an opening 25 in its left-hand end to receive a linearly expandable and contractible linkage arranged between inner pad 23A and an arm 26 pivotally connecting it to a fluid actuator A by a pin 28. As shown, the arm is connected at its lower end to the housing by a pin 27 and pivotally connected at its upper end to the actuator, so that with pin 27 positioned below pin 28, fluid pressure supplied to the left-hand side of actuator A causes the arm to swing in a clockwise direction. When such pressure is exhausted therefrom, the actuator contracts to permit the arm to swing in a counter-clockwise direction.

The linkage is shown to comprise an inner tubular member 30 having its left-hand end connected to the arm 26 by the pivot pin 28 and coaxially disposed within an outer tubular member 32 for longitudinal movement with respect thereto. As previously described, the right-hand end of the outer tubular member 32 is disposed close to the inner left side of the inner pad 23A so as to apply a force in a right-hand direction to the pads in response to brake actuation. As well known in the art, this first causes the inner pad to move into engagement with the left-hand side of the disc 22 and the caliper housing to then move to the left to force the inner left side of the outer pad 23B against the right-hand side of the disc.

The outer member is closely received within the opening 25 in the left end of the housing and surrounds the inner tubular member with some clearance between them. The right-hand end of the inner member has a conical shoulder 35, and circumferentially spaced slips 36 are arranged within a space between the conical shoulder and an inner cylindrical surface 37 on the outer member for expansion and contraction between wedging and releasing positions to cause the members to move.

A stem 41 extends through a hole in the inner member and has a flange 42 on its outer side which engages right ends of the slips and which is yieldably urged to the left by means of a coil spring 46 so as to maintain the flange tightly against the right-hand ends of the slips, thereby yieldably maintaining them in wedging position between the inner and outer members. Thus, the outer member is caused to be moved inwardly with the inner member, during brake actuation, while the inner member is permitted to move outwardly through the outer member upon relief of brake actuation.

The circumferentially spaced slip elements each have arcuate outer surfaces for engaging the cylindrical surface of the outer member and inner conical surfaces for sliding over the conical shoulder 35 of the inner tubular member, with the outer cylindrical surfaces of the slips and the inner cylindrical surface of the outer member having matching teeth 40 with radially disposed sides. Consequently, with the slips yieldably held in wedging position, as will be described, movement of the inner tubular member to the right will move the outer tubular member with it to apply a braking force to the pads, while movement of the inner tubular member to the left will permit the slips to yield inwardly so that they are free to ride over the teeth of the inner tubular member to return to a left-hand, reset position of FIG. 1A.

A coil spring 50 is arranged between an outwardly facing shoulder on the housing and a flange 51 on the left-hand end of the inner member so as to yieldably urge the inner member to the left with respect to the housing. In addition, a resilient ring 55 is received within a groove in the opening 25 in the left-hand end of the housing to surround a split ring 56 which holds a wiper ring 57 in place between the housing and about the outer side of the outer member. This ring 55 surrounds the split ring, and thus the outer member, sufficiently tightly to resist leftward movement of the outer member, especially upon leftward movement of the inner member with respect to the outer member following brake actuation.

Reviewing now the overall operation of the assembly, in the illustrated inactive position of the assembly, the inner sides of the pads are spaced slightly from opposite sides of the disc 22. As the actuator A is expanded to swing the arm 26 in a clockwise direction, and thus move the inner member to the right, and with the slips urged into wedging position between the inner tubular member and outer tubular member by the coil spring 46, inward movement of the inner member is transmitted to the outer member to cause it to move to the right and thus apply the brake.

Upon completion of brake actuation and exhaust of pressure from the actuator, the outer tubular member is prevented from moving to the left due to the detent effect of the ring 55. At the same time, however, swinging of the arm 26 in a counter clockwise direction and urging of spring 50 will permit the inner tubular member to be moved to the left to relieve the wedging effect of the slips between the inner and outer tubular members. Movement of the inner tubular member to the left relatively to the outer member will, through the flange on the left end of stem 41, carry the slips with it as the teeth slide over the teeth on the inner side of the outer tubular member.

As will be appreciated, although repeated brake actuations will cause wear of the brake pads, thus resulting in further incremental inward movements of the outer tubular member toward the right, the inner tubular member is able to return to its original position after each actuation, thus maintaining its ability to be moved between applied and relieving positions in response to minimum stroke of the actuator A.

The embodiment of the invention shown in FIGS. 2A to 5 is in many respects the same as that of FIG. 1A. Thus, it comprises a housing 20 which may be the same as the housing of FIG. 1A for receiving a disc 22 and pads 23A and 23B on its opposite sides within its interior, and with a linearly expandable and contractible linkage disposed between the inner pad and the lower end of an arm 26' pivotally mounted on the housing by means of a pin 27'.

As in the case of the linearly expandable and contractible linkage of FIG. 1A, the linkage of FIGS. 2A to 5 includes an inner member 30' having a right-hand end to which a leftward force from an actuator (not shown) may be applied through the arm 26', and an outer tubular member 32' which is closely received in opening 25' of the housing and coaxially arranged and longitudinally movable with respect to the inner tubular member to dispose its left-hand end close to the inner pad 23A. As shown, the inner sides of the pads are spaced from opposite sides of the disc when the assembly is in an inactive position.

As in the case of the embodiment of FIG. 1A, upon mechanical brake actuation, the arm 26' is rotated in a counter clockwise direction to move the inner member to the left, which movement is transmitted to the outer member by means of circumferentially spaced slip segments 36' disposed in wedging position between the inner and outer members so as to move the left-hand end of the outer member against the brake pads. However, as compared with the embodiment of FIG. 1A, the slips have outer conical surfaces disposed opposite an inner conical shoulder 35' on the outer member and inner cylindrical surfaces which closely surround the outer cylindrical surface 37' of the inner member, although, in any case, the slips function in the same way as the slips of the embodiment of FIG. 1A.

The slips are initially urged to the left toward wedging position by means of a coil spring 46' disposed between their right-hand outer ends and a washer held by a snap ring 47 mounted within an enlarged right-hand end of the outer member. Also, in this embodiment of the invention, a coil spring 50' is compressed between a snap ring 48 located in opening 71 formed in the housing to receive the inner member and a shoulder 49 on the enlarged right end of the inner member, so that the inner member is urged to its right-hand position as the arm 26' is moved in a clockwise direction in response to relief of brake actuation. As in the embodiment of FIG. 1A, movement of the outer member with the inner member is resisted, as the slips retract from wedging position, by the friction of a resilient ring 55' carried within a groove in the housing opening 25'.

Figure 5:
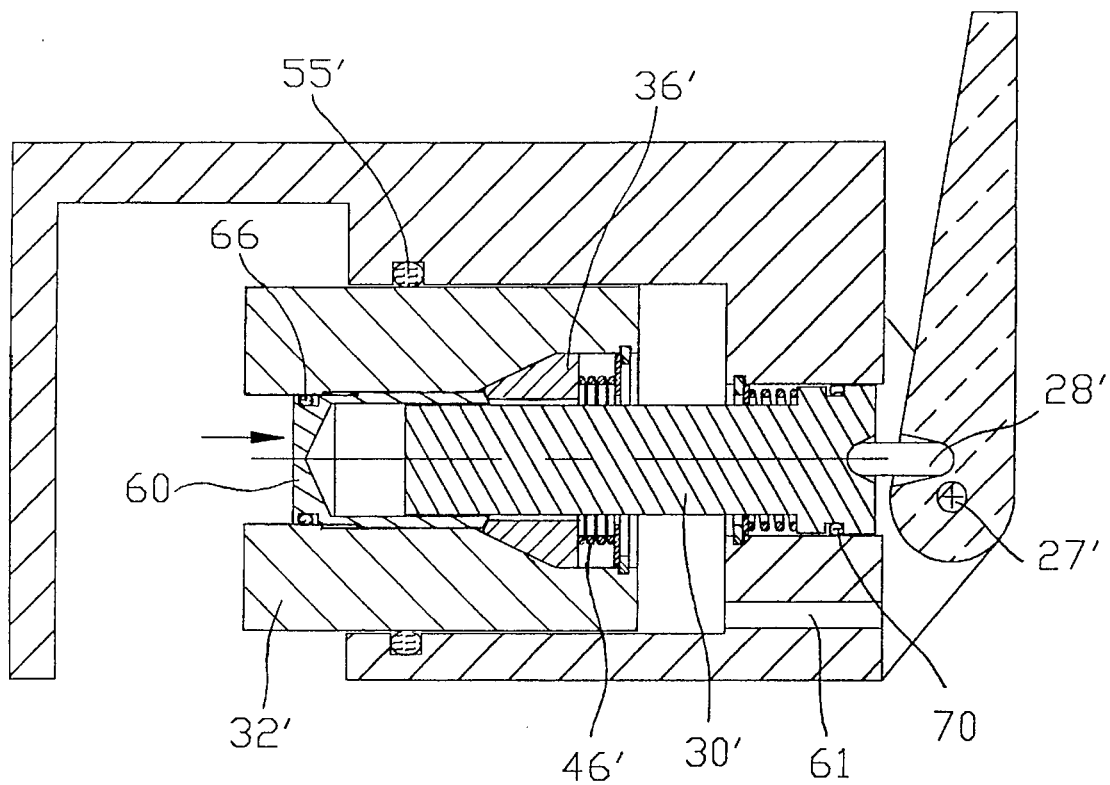
FIG. 5 is a still further view of the brake assembly shown in FIGS. 2A and 3, but with the caliper housing removed so as to permit mechanical release of the linkage for return to its original position.

In accordance with another novel aspect of the invention, a sleeve 60 is disposed between the inner and outer members with its closed left-hand end in a position for access through the open end of the outer member and with its right end opposite the left end of the slips 36'. Thus, upon removal of the caliper housing, as shown in FIG. 5, a right-hand force may be applied to the sleeve to urge it against the left-hand ends of the slips, and thus overcome the force of the coil spring 46' to move the slips out of wedging position, so that the outer member may be returned to a right-hand position to reset the system.

The ring 55' and another ring 66 carried about the sleeve form a piston area on the outer member which is responsive to fluid pressure supplied through one or more ports 61 to the interior of the housing to urge it to the left in a brake actuation mode independently of a mechanical brake actuation responsive to the actuator and arm 26'. The right end of inner member 30' carries an o-ring 70 which sealably engages opening 71 in the right end of the housing to form a piston which is also responsive to such pressure in the housing to urge the inner member to the right, along with the force of spring 50'. This combined force is greater than that of spring 46' so that the inner member does not move to the left with the outer member as fluid pressure is applied to its piston.

Since the left end of sleeve 60 is closed and seal ring 66 about it is slidably engaged within the inner diameter of the outer member, the sleeve is urged to the left in response to the fluid pressure. An outwardly facing shoulder 55A about the sleeve is engageable with an inwardly facing shoulder on the inner diameter of the outer member so as to limit this movement of the sleeve to the left.

In this embodiment, counter clockwise swing of the arm 26' in response to mechanical brake actuation, transmits leftward movement to the inner member through a bar 28' received between slots in adjacent sides of the inner member and arm. At the same time, upon relief of brake actuation, the inner member is free to move further to the right in response to clockwise swinging of the arm.

Figure 6:
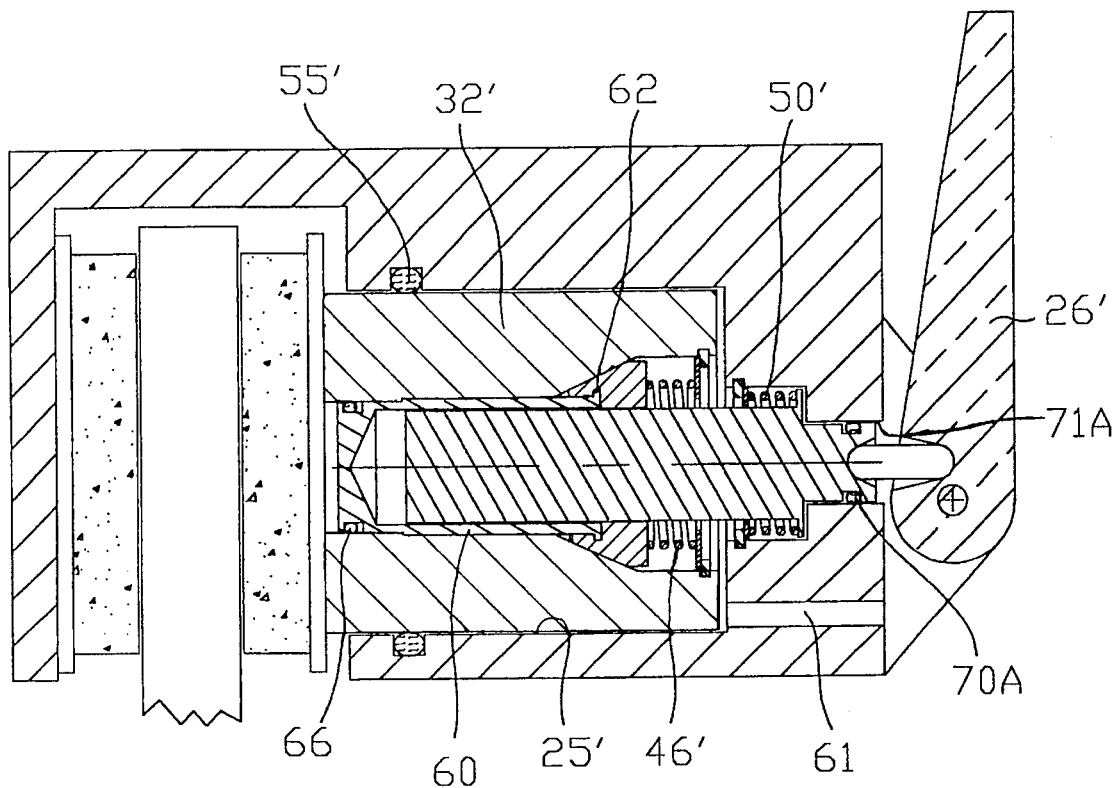
FIG. 6 is a longitudinal cross-sectional view of a modified version of the assembly shown in FIGS. 2A, 3 and 5.

The embodiment of the brake assembly of FIG. 6 is very similar to that of FIGS. 2A to 5, except that its sleeve 60 has an outwardly extending flange 62 on its right-hand end which engages in a groove in the slips so as to prevent the linkage from linearly expanding upon application of the fluid pressure. Thus, when the piston of the outer member responds to fluid pressure and moves to the left, the pressure responsive sleeve 60 will pull the slips and the inner member to the left with it. There is a flange on the inner member within a counterbore intermediate openings 25' and 71 so as to compress the spring 50' between the inner member and housing. Consequently, when fluid pressure is applied, advancement of the teeth on the inside of the slips and about the inner member is only permitted upon retraction of the inner member to the left once clearance has been obtained by the pads.

Furthermore, in this embodiment, the outer end of the inner member and thus the seal ring 70A are of smaller diameter for slidably engaging a smaller opening 71A in the housing. Hence, the force urging the inner member to the right is less then that in the FIG. 5 embodiment.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A disc brake caliper assembly, comprising a caliper housing, a disc mounted within the housing, an outer pad between a wall of the housing and one side of the disc, an inner pad on the other side of the disc, and a non-rotating, linearly expandable and contractible linkage, including inner and outer members mounted for coaxial longitudinal reciprocation without rotation with respect to one another, a first of the members having surfaces which extend at an acute angle with respect to an axis and opposite surfaces of the second member which extends parallel to such axis, circumferentially spaced wedge means disposed in the space between the angled and parallel surfaces on the members, means acting between the first member and wedge means to yieldably urge the wedge means in a first longitudinal direction toward the angled surfaces and thus into a wedging relation between the members to restrict motion of the second member in the first direction relatively to the first member, and means operable during a brake cycle for moving the second member longitudinally in a second longitudinal direction opposite to the first longitudinal direction and thus relatively to the first member, whereby the linkage is caused to expand in order to adjust for pad wear.

2. A disc brake caliper assembly as in claim 1, wherein the moving means comprises an actuator, and an arm connecting the actuator to the second member.

3. A disc brake caliper assembly as in claim 1, including means acting between the housing and second member to urge said second member in the second longitudinal direction.

4. A disc brake caliper assembly as in claim 1, comprising means forming a piston on the outer member, and means for admitting fluid pressure supplied to the interior of the housing in order to act over the piston to force the end of the first member against the inner pad independently of said moving means.

5. A disc brake caliper assembly as in claim 4, including a longitudinally slidable, pressure responsive means which engages the wedge means to prevent relative longitudinal motion of the first and second members during the fluid brake application.

6. A disc brake caliper assembly as in claim 1, wherein the angled and parallel surfaces are, respectively, conical and cylindrical, and the wedge means are circumferentially spaced, radially expandable and contractible slips.

7. A disc brake caliper assembly as in claim 1, wherein the parallel surfaces have teeth for engagement with teeth on the slips when the slips are in a wedging position.

8. A disc brake caliper assembly as in claim 1, wherein the angled surfaces are on the inner member.

9. A disc brake caliper assembly as in claim 1, wherein the angled surfaces are on the outer member.

10. A disc brake caliper assembly as in claim 1, including a longitudinally slidable means having one end accessible from outside the assembly and the other end engageable with the wedge means to permit the wedge means out of the wedging position so that the first and second members may be reset.

11. For use in a disc brake caliper assembly having a caliper housing, a disc in the housing, an outer pad disposable between a wall of the housing and one side of the disc, an inner pad on the other side of the brake element, and a brake applicator, the improvement comprising a non-rotating, linearly expandable and contractible linkage, including inner and outer members mounted for coaxial longitudinal reciprocation without rotation with respect to one another, and a first of the members having surfaces which extend at an acute angle with respect to an axis and opposite surfaces of the second member which extend parallel to such axis, circumferentially spaced wedge means disposed in the space between the angled and parallel surfaces on the members, means acting between the first member and wedge means to yieldably urge the wedge means in a first longitudinal direction toward the angled surfaces and thus into wedging relation between the members to restrict the motion of the second member in the first direction relatively to the first member, and means operable during a brake cycle for moving the second member longitudinally in a second longitudinal direction opposite to the first longitudinal direction and thus relatively to the first member, whereby the linkage is caused to expand in order to adjust for pad wear.

12. A disc brake caliper assembly as in claim 11, wherein the moving means comprises an actuator, and an arm connecting the actuator to the second member.

13. A disc brake caliper assembly as in claim 11, including means acting between the housing and second member to urge said second member in the second longitudinal direction.

14. A disc brake caliper assembly as in claim 11, comprising means forming a piston on the outer member, and means for admitting fluid pressure supplied to the interior of the housing in order to act over the piston to force the end of the first member against the inner pad independently of said moving means.

15. A disc brake caliper assembly as in claim 14, including a sleeve longitudinally slidable between the members and having one end accessible through the end of the first member and the other end engageable with the wedge means to enable the sleeve to force the wedge means out of wedging position to permit the members to be reset and said piston formed thereon to urge the sleeve toward the inner pad, and means connecting the sleeve to the wedge means for movement therewith so as to prevent movement of the wedge means with the second member.

16. A disc brake caliper assembly as in claim 11, wherein the angled and parallel surfaces are, respectively, conical and cylindrical, and the wedge means are circumferentially spaced, radially expandable and contractible slips.

17. A disc brake caliper assembly as in claim 11, wherein the parallel surfaces have teeth for engagement with teeth on the slips when the slips are in a wedging position.

18. As in claim 15, wherein the angled surfaces are on the inner member.

19. A disc brake caliper assembly as in claim 11, wherein the angled surfaces are on the outer member.

20. A disc brake caliper assembly as in claim 11, including a longitudinally slidable means having one end accessible from outside the assembly and the other end engageable with the wedge means to permit the wedge means out of the wedging position so that the first and second members may be reset.

\* \* \* \* \*